Nov. 12, 1957 R. B. ABBOTT, JR 2,813,045
METHOD AND APPARATUS FOR COATING GLASSWARE
Filed Feb. 23, 1955
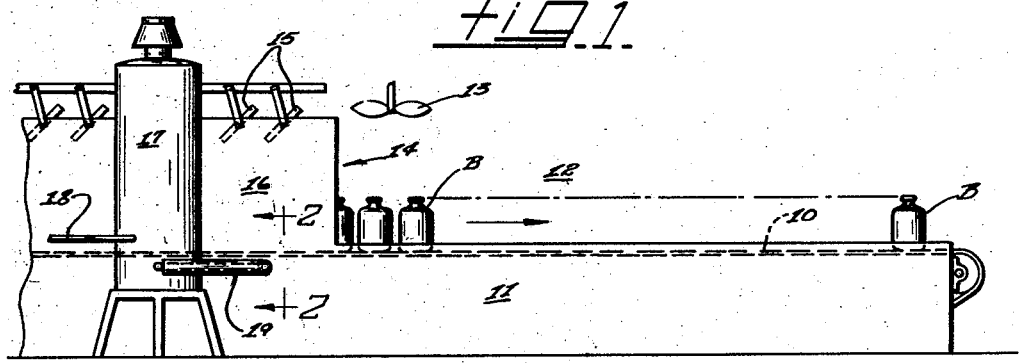
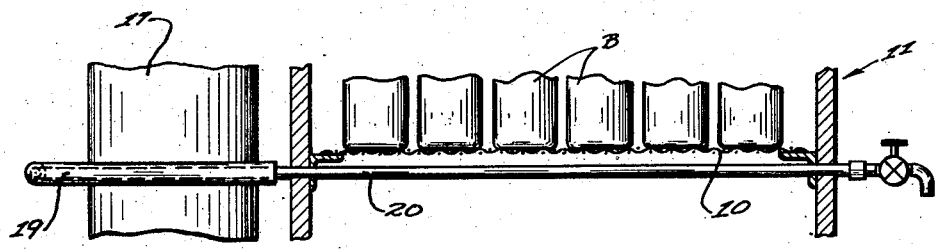
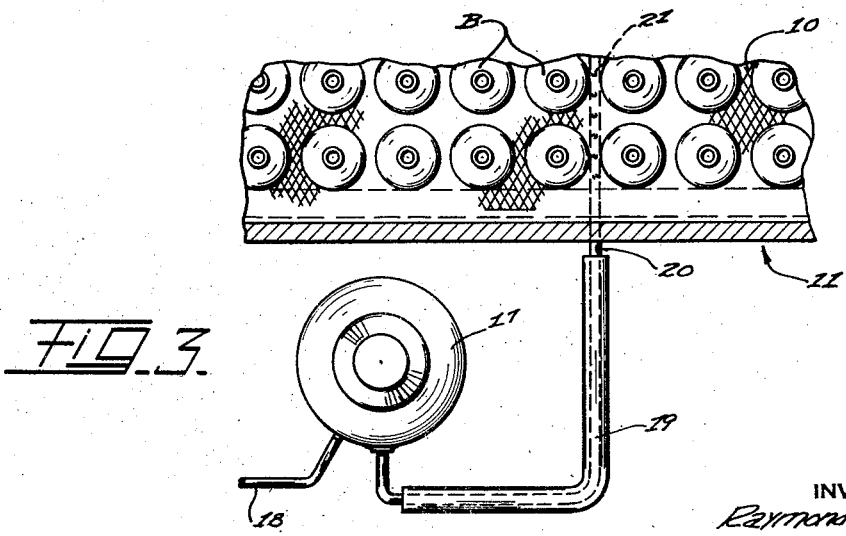
INVENTOR
Raymond B. Abbott, Jr.
BY
Rule & Hoge
ATTORNEYS

United States Patent Office 2,813,045
Patented Nov. 12, 1957

2,813,045

METHOD AND APPARATUS FOR COATING GLASSWARE

Raymond B. Abbott, Jr., Los Angeles, Calif., assignor to Owens-Illinois Glass Company, a corporation of Ohio Application February 23, 1955, Serial No. 489,949

2 Claims. (Cl. 117—54)

The present invention is a novel and economical method of and apparatus for applying a lubricous protective coating or film to the exterior surfaces of glass containers, such as bottles and jars.

Treatment of the exterior surfaces of freshly annealed virgin bottles and jars, formed of glass, to effectively protect same against being scratched, bruised, etc., incident to handling between the forming machine and the customer's filling line, has long been desired in the trade and the attainment of such in a simple, economical fashion, is a prime object of my invention.

Inherently, freshly formed glass containers, even after complete cooling following the annealing operation, have a "tacky" exterior surface which resists relative sliding of such containers while in contact with one another. In the event sufficient force is applied to overcome resistance to such sliding movement, the surfaces become scuffed, scratched or bruised, so that the containers are at least unsightly, if not actually physically weakened and unmarketable.

Coatings of various kinds have been used in the past in an unsuccessful effort to effect satisfactory protection. Silicones, carbowax and such materials have been utilized, but without satisfactory results. One of the objections also to methods used heretofore is that the coating material employed was sprayed downwardly onto the containers as they moved in normal upright position along a predetermined path. Such necessarily resulted in entry of some of the material into the containers nad failure to effectively coat the critical areas of the exterior surface. The critical areas usually are those side surfaces generally close to the bottom, such being so because these are the surfaces which frequently rub against each other, or are subject to impact incident to manual inspection following annealing and miscellaneous handling operations thereafter. Such critical surfaces however, are not invariably in these areas and may well extend the full height of the container body.

Another object of my invention therefore is to utilize a novel effective coating material and apply same in such fashion as to insure formation of the protective film where most needed and additionally completely avoid entry of any of the material into the containers.

A further object is the provision of a novel and efficient method for applying a protective exterior coating to glass containers, such method involving transforming a dilute aqueous solution of lubricous organic material into a vapor state and thereafter condensing this material upon the desired glass surfaces.

It is also an object of my invention to provide novel method and means for condensing a lubricous organic material, such as a water-soluble wax, upon the exterior surface of glass containers while the water carrier for the wax is in the form of invisible superheated steam or vapor which moves past the containers so that no portion thereof is deposited upon said surfaces.

Furthermore it is an object of my invention to provide a novel method in which the temperatures of the glass surfaces and vapor at the time of initial contact with each other, are such as to minimize any tendency on the part of the water carrier for the wax, to condense or accumulate upon the glass surfaces.

Other objects will be in part apparent and in part pointed out hereinafter.

In the drawings:

Fig. 1 is a fragmentary side elevational view of the discharge end of a conventional annealing lehr showing my invention associated therewith;

Fig. 2 is a sectional elevational view taken substantially along line 2—2 of Fig. 1; and Fig. 3 is a fragmentary sectional plan view of the lehr, manifold and the vaporizer unit.

In accordance with my invention, bottles B or other similar virgin glass containers are placed side by side in normal upright positions upon the ware conveyor 10 of an annealing lehr 11, said conveyor being of wire mesh, or such reticulated form. The containers are placed quite close to, but out of actual physical contact with one another for obvious reasons, an important one of which is the avoidance of sticking together of the hot surfaces. The lehr includes an open or cooling section 12 where cooling of the ware may be accelerated by fan means 13 placed in proximity to the exit end of the tunnel 14. Louvres 15 in the roof of the tunnel are adjustable to regulably control the rise of heated air from said tunnel. The foregoing is more or less conventional annealing lehr construction.

To the end that the coating material may be effectively applied to the exterior surfaces of the containers, to the complete exclusion of the interior surfaces, application of same is obtained by blowing a water-soluble wax carrying vapor upwardly through the reticulated conveyor 10 and over the glass surfaces.

I have ascertained for example that polyoxyethylene stearate (a water-soluble wax) produces an excellent lubricous film on glass surfaces if applied under properly controlled conditions as regards temperature and surrounding atmosphere. It completely removes the normal relatively "tacky" surface conditions, which as stated, very noticeably tend to prevent free sliding of one surface upon another and consequently results in severe scratching or abrasion of same.

Specifically, according to my invention, glass bottles, jars or such containers B, while in normal upright position, and out of physical contact with one another, are carried through the annealing lehr 11. The temperature conditions are so regulated that when the containers reach the coating zone 16, at least their exterior surfaces are within a temperature range of about 140° F. to 200° F. In this zone the containers travel slowly through an upwardly moving vapor cloud which is the product of a dilute aqueous solution composed of water and about .025% polyoxyethylene stearate (water-soluble wax) or some other suitable organic material having similar lubricating characteristics.

The dilute aqueous solution of lubricous organic material is delivered at about 80° F., and approximately 5 p. s. i., to the vaporizer 17, and at the desired rate through a supply pipe 18. This vaporizer is a flash type steam generator designed to produce low pressure superheated steam. The exceedingly rapid vaporization of the water in the solution develops sufficient kinetic energy at the elevated temperature (about 600° F.) to transform the lubricous materials into a vapor. Thus, fractional distillation does not occur and the original solution is discharged from the vaporizer in a dry vapor phase.

An insulated pipe 19 conducts the vapor to a lehr manifold 20 which extends across the lehr immediately beneath the conveyor 10 in the coating zone 16. Upwardly facing apertures 21 in the manifold direct the vapor upwardly through the conveyor 10 and over the exterior surfaces of the containers. At the point of discharge from the manifold, the temperature of the vapor is about 400° F. and it is in the form of invisible superheated steam. As this vapor moves upwardly more or less as a cloud, over the cooler glass surfaces, the lubricous organic materials condense on said surfaces and produce the desired coating or film. Because the water carrier tends to remain in a vapor state there is little if any, opportunity for any condensate to accumulate on or in the containers. Also, since the vapor is blown upwardly over the glass surfaces, it is obvious that the chances of any material entering the open upper ends of the containers, are quite remote.

Following the described coating step, the containers move on until they are beneath the cooling fan 13. Here the containers and the coating material are cooled rather rapidly, resulting in the desired setting of the coating.

Modifications may be resorted to within the spirit and scope of the appended claims.

I claim:

1. In apparatus of the character described, a glassware annealing lehr including a heated horizontal chamber having inlet and outlet ends, a cooling section at the outlet end, a reticulated horizontal conveyor for carrying virgin glass containers through the chamber and cooling section with such containers upright and spaced apart on the conveyor, a horizontal manifold mounted immediately beneath and extending transverse to the length of said conveyor within said chamber and at a point in close proximity to the outer end of the latter, said manifold formed with a plurality of upwardly opening discharge apertures therein, a source of supply for a dilute aqueous solution of lubricous organic material, means connected to said source of supply and the manifold and operable to transform the solution into a vapor having a temperature of approximately 600° F. when it initially reaches the desired vapor state.

2. The method of coating exterior surfaces of annealed virgin glass containers with a lubricous film which consists in bringing at least the exterior surface temperature of the containers into a range between about 140° F. and 200° F., transforming a dilute aqueous solution of lubricous organic material into a vapor having a temperature between about 400° F. and 600° F., and spraying the vapor upwardly over the exterior surfaces of the containers, said solution being composed of a water carrier and an organic lubricous material comprising about .025% of the total solution.

References Cited in the file of this patent

UNITED STATES PATENTS

| | | |
|---|---|---|
| 2,016,381 | McBurney | Oct. 8, 1935 |
| 2,355,225 | MacWilliam | Aug. 8, 1944 |
| 2,369,737 | Jackson et al. | Feb. 20, 1945 |
| 2,511,797 | Hochberg | June 13, 1950 |
| 2,539,159 | Peiler | Jan. 23, 1951 |

FOREIGN PATENTS

| | | |
|---|---|---|
| 417,102 | Great Britain | Sept. 27, 1934 |